US012030331B2

(12) United States Patent
Asensio Balet et al.

(10) Patent No.: US 12,030,331 B2
(45) Date of Patent: Jul. 9, 2024

(54) PRINT-MEDIUM PAPER AND METHOD

(71) Applicant: SAICA, S.A. INDUSTRIAS CELULOSA ARAGONESA, Saragossa (ES)

(72) Inventors: Federico Asensio Balet, Saragossa (ES); Alberto Mena Diaz De Corcuera, Saragossa (ES); Diego Compaired Turlan, Saragossa (ES)

(73) Assignee: SAICA, S.A. INDUSTRIAS CELULOSA ARAGONESA, Saragossa (ES)

( * ) Notice: Subject to any disclaimer, the term of this patent is extended or adjusted under 35 U.S.C. 154(b) by 321 days.

(21) Appl. No.: 17/424,860

(22) PCT Filed: Jan. 24, 2020

(86) PCT No.: PCT/IB2020/000045
§ 371 (c)(1),
(2) Date: Jul. 21, 2021

(87) PCT Pub. No.: WO2020/152531
PCT Pub. Date: Jul. 30, 2020

(65) Prior Publication Data

US 2021/0348337 A1 Nov. 11, 2021

(30) Foreign Application Priority Data

Jan. 25, 2019 (EP) .................................... 19382052

(51) Int. Cl.
*B41M 5/52* (2006.01)

(52) U.S. Cl.
CPC ............ *B41M 5/5218* (2013.01); *B41M 5/52* (2013.01); *B41M 5/5245* (2013.01); *B41M 5/5254* (2013.01)

(58) Field of Classification Search
CPC .... B41M 5/5218; B41M 5/52; B41M 5/5245; B41M 5/5254
USPC ........................................................ 428/32.1
See application file for complete search history.

(56) References Cited

U.S. PATENT DOCUMENTS 5,751,330 A * 5/1998 Austin ........................ B41J 3/01 347/171
2001/0012556 A1* 8/2001 Kondo ................. B41M 5/5218 428/32.24
2001/0036552 A1* 11/2001 Otani ..................... B41M 5/502 428/411.1

(Continued)

*Primary Examiner* — Betelhem Shewareged
(74) *Attorney, Agent, or Firm* — Nolte Lackenbach Siegel

(57) ABSTRACT

A print-medium paper comprising a base paper (3) and at least one external or top white side (4) suitable to be printed directly, without the need of the application of a primmer or a bonding agent or external layer substance prior to/on color printing devices, comprising at least one mineral particle which preferable comprises calcium ions and more preferable is anionic ultrafine ground calcium carbonate and at least one binder. The external or top white side (4) preferable comprise a second mineral particle without calcium ions which more preferable is titanium dioxide. Packaging product comprising the print-medium paper claimed. A method for producing the print medium paper claimed. Use of the print medium claimed in a digital printer or a printer based on the use of inkjet technology heads, characterized in that a print medium is printed directly.

18 Claims, 2 Drawing Sheets

(56) References Cited

U.S. PATENT DOCUMENTS

| | | | | |
|---|---|---|---|---|
| 2003/0138608 | A1* | 7/2003 | Landry-Coltrain | B41M 5/502 428/195.1 |
| 2006/0010619 | A1* | 1/2006 | Hees | D06P 1/613 8/445 |
| 2007/0092666 | A1* | 4/2007 | Hood | C09D 123/0853 428/32.34 |
| 2013/0257990 | A1* | 10/2013 | Swei | B41M 5/506 347/101 |
| 2014/0139601 | A1* | 5/2014 | Pal | B41M 5/506 427/407.1 |
| 2021/0348337 | A1* | 11/2021 | Asensio Balet | B41M 5/5245 |

* cited by examiner

PRINT-MEDIUM PAPER AND METHOD

OBJECT OF THE INVENTION

The present invention refers to a print-medium paper comprising a base paper of containerboard grade made out of 60% to 100% recycled fibers suitable to be used in corrugated board products containing at least one external or top white side suitable to be printed directly in a digital printer or a printer based on the use of inkjet technology heads, without the need of the application of a primmer or a bonding agent, and suitable to be printed in a flexographic printer without the need of a dryer on or after color printing devices. In invention also refers to the method for producing the said print medium, a device for implementing the said method and the use of this print medium in different printers.

BACKGROUND ART

Nowadays different digital or inkjet technologies for printing a print-medium paper comprising a base paper of containerboard grade made out of 60% to 100% recycled fibers suitable to be used in corrugated board products are available: Drop on Demand technologies (piezoelectric or thermal inkjet technologies) or Continuous inkjet technology.

- Thermal inkjet technology uses heat to vaporize a thin layer of ink to form a bubble that expels a small drop of ink through a nozzle.
- Continuous inkjet nozzles form a steady stream of fluid under pressure from an array of uniform nozzles. Individual streams are stimulated by thermal energy to break each stream into individual droplets. The droplets are directed to the media or to a recirculation catcher as determined by the input data stream.
- Digital or ink jet technology printing comes to huge drawbacks when a coated paper surface intends to be printed.

Usually, aqueous pigmented inks or die inks are used by these technologies; these inks require a high absorptive and fast drying medium to ensure right color density, avoid ink bleeding, reduce ink rub-off or smearing and to increase productivity by running at high speeds.

Conventional coated printing media are not able to fulfill those key requirements to be printed successfully throughout a digital or inkjet printing process.

It is possible to minimize those problems by the application of a pretreatment onto the coated surface medium prior to be passed through the digital or inkjet printing process. This pretreatment is known as a primmer or a bonding agent. The application of those pretreatments requires the addition of extra technology which increases total investment and decreases line productivity due to potential stuck and rump up process. (EP 2 344 341 B1)

EP 2 414 171 B1 refers to an inkjet receptive coating layer which contains a Metallic Salt to fix the ink pigments onto the surface of the media. The addition of a Metallic Salt will cause an incompatibility with anionic compounds such as binders which come into a poor media aspect due to a mottle effect on its surface resulting in a bad printability when flat colors are printed.

WO 2016/105417 A1 and WO 2016/105413 A1 describe several coating compounds to avoid incompatibilities with metallic salt but without considering that some key compounds critical to apply successfully a coating onto a substrate such as stretchers or surfactants remain the coating anionic charge. On top of that, those publications do not refer to any improvement regarding the high absorption demand required for aqueous inkjet inks application at high speeds.

It is also possible to print a print-medium paper comprising a base paper of containerboard grade made out of 60% to 100% recycled fibers suitable to be used in corrugated board in a flexographic printer.

Flexographic inks are waterbased inks with a low amount of dry solids, on top of that a big portion of existing flexographic printing units have a limited ink volume control. Coated grades performance is limited under these conditions, printing units productivity and output is far below comparing with an uncoated substrate. Therefore, conventional coated printing media are not able to fulfill those key requirements to be printed successfully throughout a flexographic printer.

It is possible to minimize those problems by the application of a dryer on or after color printing devices. The application of this dryer requires the addition of extra technology which increases total investment and decreases line productivity due to potential stuck and rump up process.

WO 2014/044778 A1 discloses a cationic coating formulation consisting of water, at least one anionic ultrafine ground calcium carbonate, at least one non-ionic polyvinyl alcohol, at least one dispersing agent, and at least one cationic polymer, wherein the at least one anionic ultrafine ground calcium carbonate, when in the form of a compacted bed, has a monomodal pore size distribution, a volume defined pore size polydispersity expressed as full width at half maximum (FWHM) from 40 to 80 nm, and a volume defined median pore diameter from 30 to 80 nm, and wherein the cationic coating formulation has a solid content in the range from 10 to 80 wt.-%, based on the total weight of the cationic coating formulation. This cationic formulation doesn't comprise at least one water-soluble salt of a divalent metal ion as a wetting agent. The main function of the wetting agent is to improve absortion. Since the cationic coating formulation of WO 2014/044778 A1 didn't reached the required ink adon level, a dryer should be used to dry the ink after each of the colours in a flexographic printer. Therefore, it would be interesting to have a composition which permits printing in a flexographic printer without dryers between colors.

Therefore, it remains the need of a print medium comprising a base paper of containerboard grade made out of 60% to 100% recycled fibers suitable to be used in corrugated board products which offers a high absorption and a right pigment fixation of digital or inkjet inks without the use of a pretreatment or primer, at the printing unit, and offers an acceptable coated grade performance of flexographic inks without the use of a dryer on or after color printing.

DISCLOSURE OF THE INVENTION

Figure 1:
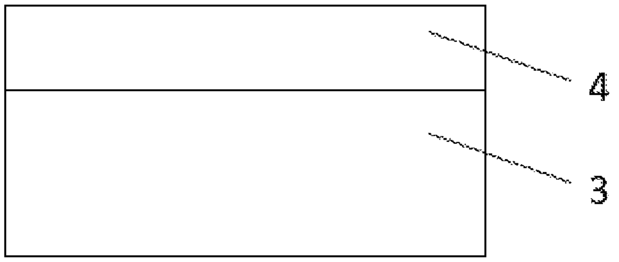
FIG. 1 shows a first example of print-medium paper comprising a base paper (3) and an external or top white side (4).
Figure 2:
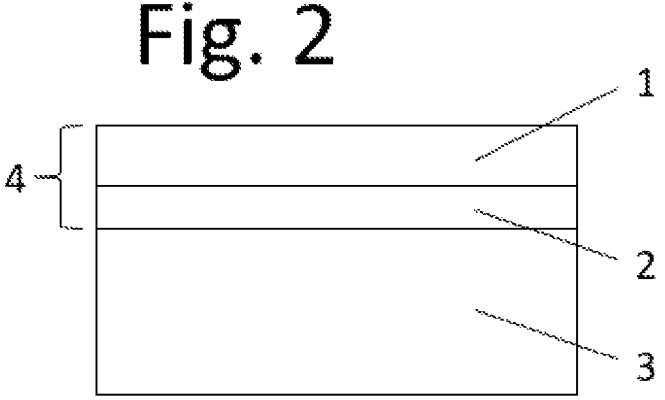
FIG. 2 shows a second example of the print-medium paper, where the external or top white side (4) comprises two coating layers: a first coating layer (2) and a second coating layer (1).
Figure 3:
FIG. 3 shows another example of print-medium paper where the external or top white side (4) comprises two coating layers; each coating layer having more than one sub-layer.
Figure 4:
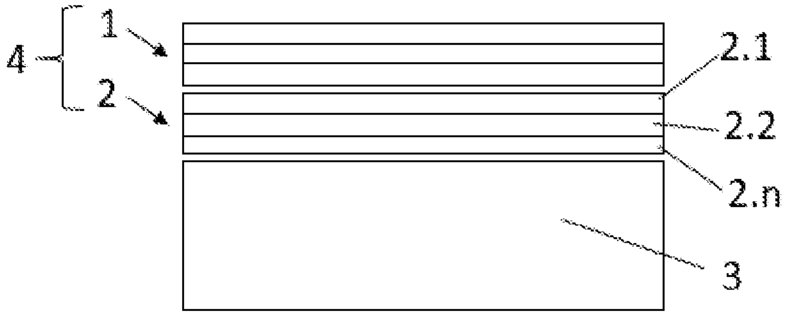
FIG. 4 shows yet another example of print-medium paper where the external or top white side (4) comprises two coating layers; each coating layer having more than one sub-layer.

The print medium paper of the present invention comprises a base paper of containerboard grade made out of 60% to 100% recycled fibers suitable to be used in corrugated board products with an external side as a coating layer on one or both sides. The external layer or top white side comprises water, a first mineral particle consisting in anionic ground calcium carbonate with a particle size $d_{50}$ of ≤300 nm, a first binder consisting in one non-ionic polyvinyl alcohol, at least one water-soluble salt of a divalent metal ion, at least one dispersing agent, and at least one cationic polymer. The anionic ground calcium carbonate with a particle size $d_{50}$ of ≤300 nm not stable in high conductivity systems, when in the form of a compacted bed, has a monomodal pore size distribution, a volume defined pore size polydispersity expressed as full width at half maximum (FWHM) from 40 to 80 nm, and a volume defined median pore diameter from 30 to 80 nm. The external or top white side has a solid content in the range from 10 to 80 wt.-%, based on the total weight of the external or top white side, and doesn't comprise cationic or neutral calcium carbonate. Stability in high conductivity systems means that there is no electrical destabilization of the boundary layer around the particle, so agglomeration is avoided when subjected to electrical currents. It is achieved by the addition of a dispersant.

Anionic ground calcium carbonate with a particle size d50 of ≤300 nm brings whiteness to the paper and improves the point definition in the printing process. Adding at least one water-soluble salt of a divalent metal ion as a wetting agent to a cationic coating formulation causes a destabilization of some of the other components. Considering the state of the art, a skilled person on printing technology wouldn't use water-soluble salt of a divalent metal ion as a wetting agent in a cationic coating formulation.

The external side should be understood as any layer or plurality of layers applied on the base paper, where the printing may take place. It should be preferably an absorbent, permeable, and adapted coating-based surface made from the application of one or several layers.

According to a first preferred embodiment of the present invention, the external layer or top white side comprises a second mineral comprising calcium ions and is selected from the group consisting in ground calcium carbonate, precipitated calcium carbonate, modified calcium carbonate, calcium chloride, calcium sulfate, calcium oxide, calcium phosphate, and a combination thereof. In a more preferred embodiment, the second mineral particle with calcium ions is especial anionic ground calcium carbonate stable in high conductivity systems because it contains a dispersing agent to avoid agglomeration of calcium carbonate particles in this kind of media. In a preferred embodiment the special anionic ground calcium carbonate has a particle size d50 of ≤1500 nm.

According to a first preferred embodiment of the present invention, the external layer or top white side comprises a third mineral particle which doesn't comprise calcium ions and is selected from the group consisting of calcinated clays, kaolin clays, talc, alumina, silica, titanium dioxide, zeolite, magnesium sulfate, magnesium carbonate, magnesium chloride, sodium chloride, sodium sulfate and combinations thereof.

In a most preferred embodiment of this second embodiment in relation to the mineral particle, the mineral particle is titanium dioxide.

The purpose of this mineral, specially titanium dioxide, is to opacify the external layer or top white side, mainly in humid or wet conditions, where calcium carbonate alone become transparent and base paper color appears loosing ISO brightness in the print medium.

Because of that, the suitable mineral particle that doesn't comprise calcium ions can be used in mixture with the ground calcium carbonate or ultrafine ground calcium carbonate.

According to a third embodiment of the present invention the external side comprises, as mineral particle, both anionic ultrafine ground calcium carbonate and titanium dioxide.

According to any of the embodiments in relation to the mineral particle, the amount of the mineral particle in the coating layer can range from 50 to 95 wt %, e.g., preferably from 60 to 95 wt %, most preferably from 70 to 95 wt % based on the total weight of the coating layer.

According to another preferred embodiments of the present invention, the external layer or top white side comprises a second binder which is a hydrophilic binder and is selected from the group consisting in polyvinyl alcohol fully or partially hydrolyzed, polyvinyl acetate, native starch, modified starch, starch and derivatives, casein, soy protein, chitosan, guar gum, carboxymethylcellulose, and combinations thereof. This type of binder improves water retention and increases viscosity in the colour formulation and improves the dry strength of the external layer or top white side.

In a most preferred embodiment the second binder is hydrophilic binder carboxymethylcellulose. This specific binder is stable in high conductivity system According to another preferred embodiments of the present invention, the external layer or top white side comprises a third binder which is an hydrophobic binder not stable in high conductivity systems and is selected from the group consisting in styrene-butadiene latex, acrylonitrile-butadiene latex, styrene acrylate latex, polyurethane latex, polyvinylacetate latex, polyester latex, copolymers of n-buthilacrylate and ethylacrylate or copolymers of vinylacetate and acrylic latex, and combinations thereof. This binder "binds" the mineral particles used in the external layer or top white side to develop a continuous, homogeneous and stable layer. Ever more, together with the first binder (polyvinilalcohol) binds the external layer or top white side to the base paper.

In a most preferred embodiment the third binder is styrene butadiene latex. This latex is used because in chemically compatible with the synthetic sizing agent used to hydrophobize and find Cobb 60 values in the base paper. An example of styrene butadiene latex is Litex 9460 commercially available from the company Synthomer.

According to one embodiment, sublayers can contain a mixture of hydrophilic and hydrophobic binders. For example, a mixture of poly vinyl alcohol and styrene butadiene latex. Every sublayer will have different ratios between hydrophilic latex and hydrophobic latex. For example, in the top sublayer the hydrophilic binder can have a range hydrophilic/hydrophobic latex from 100%/0% to 10%/90%. For example, in the substrate's pre-coat the rate of range hydrophilic/hydrophobic latex can be from 0%/100% to 50%/50%.

According to any of the binder embodiments, the amount of coating binder in the coating layer is from 1 to 25 wt % based on the total weight of the coating layer, preferably from 3 to 25 wt % and more preferably from 4 to 25 wt %.

In a preferred embodiment, the external a or top white side comprises at least a fourth binder which is an hydrophobic binder stable in high conductivity systems and is selected from the group consisting in styrene-butadiene latex, acrylonitrile-butadiene latex, styrene acrylate latex, polyurethane latex, polyvinylacetate latex, polyester latex, copolymers of n-buthilacrylate and ethylacrylate or vinylacetate, and acrylic latex, and combinations thereof. In a more preferred embodiment, the fourth binder is a special styrene-butadiene latex stable in high conductivity systems. because it contains a special dispersing agent to avoid electrical destabilization of the boundary layer around the latex particle in order to avoid the agglomeration of latex particles in this kind of media.

According to any of the embodiments of the present invention, the external layer or top white comprises a cationic polymer selected from the group consisting in polydiallyldimethil ammonium chloride (PolyDACMAC), polyethileneimine, polyvinylamine, polyamine, and combinations thereof. The effect of the cationic polymer is to ensure that the print medium is cationic in order to increase the printability and the stability of the carbonate or latex dispersions when a wetting agent is applied. The effect of the cationic polymer is to ensure that the print medium is a little bit cationic in order to increase the printing quality by improving the connection between the print media and the ink.

In a most preferred cationic-polymer embodiment, the cationic polymer is polydiallyldimethil ammonium chloride (PolyDACMAC). This product has been selected because has a medium molecular weight and not too high cationic charge.

According to any of the cationic-polymer embodiments, the amount of cationic polymer is present in the coating layer in a range from 0.1% to 12% by dry weight.

According to one exemplary embodiment, the external layer or top white comprises a wetting agent selected from the group consisting in silica, calcium chloride, calcium sulfate, sodium chloride, sodium sulfate, magnesium sulfate, magnesium chloride, potassium chloride and/or potassium sulfate. The wetting agent is important to enhance its wettability and modify the surface tension of such printing medium.

Preferably, the wetting agent is calcium chloride because of his big capacity of water absorption.

Preferably the wetting agent is present in an amount of less than 5 wt % based on the total weight of the coating layer, preferably from 0.5 to 4.5 wt % and more preferably from 0.75 to 4.0 wt %.

The coating layer may contain further optional additives. Suitable additives may comprise, for example, dispersants, surfactants, rheology modifiers, lubricants, defoamers, optical brightness, dyes, preservatives or pH controlling agents.

According to one embodiment, the external layer or top white comprises a rheology modifier to adapt the color viscosity to the applicator requirements and a surfactant to find the correct surface tension of the color.

Preferably, the rheology modifier is in an amount of less than 1 wt % based on the total weight of the coating layer. Also, preferably the surfactant is in an amount of less than 1 wt % based on the total weight of the coating layer.

In a preferred embodiment the external layer or top white comprises at least two coating layers in order to functionalize a better performance of each one of them. A first coating layer is used to opacify and condition the base paper in order to increase the brightness of the base paper from 16 to 19° ISO to 60 to 75° ISO and to bind with the base paper by one side. The second coating layer is used to get an external or top white side with a correct strength and a good printability and good absorption thanks to the wetting agent.

A first coating layer (2) that comprises

- anionic ground calcium carbonate with a particle size $d_{50}$ of ≤300 nm, as a mineral particle not stable in high conductivity systems
- titanium dioxide as a mineral particle
- styrene butadiene latex as a hydrophobic binder not stable in high conductivity systems
- non-ionic polyvinyl alcohol as a hydrophilic binder
- at least one rheology modifier
- at least one surfactant, A second coating layer (1) applied after the first coating layers that comprises

- especial anionic ground calcium carbonate stable in high conductivity systems.
- non-ionic polyvinyl alcohol as a first hydrophilic binder
- carboxymethylcellulose as second hydrophilic binder
- special styrene butadiene latex stable in high conductivity systems as a hydrophobic binder.
- polydiallyldimethylammonium chloride (PolyDadmac) as a cationic polymer
- Calcium chloride as a wetting agent and viscosity modifier Preferrably the % of each component is the following.

70 to 90 wt % of a base paper, made of 60 to 100% recycled based material 5 to 20 wt % of a first coating layer (2) consisting on the following components:

- 60-82 wt % of anionic ground calcium carbonate with a particle size d50 of ≤300 nm not stable in high conductivity systems
- 0-25 wt % of titanium dioxide
- 5-14 wt % of styrene butadiene latex as a hydrophobic binder not stable in high conductivity systems
- 0.2-2 wt.-% of at least one non-ionic polyvinyl alcohol,
- 0.05-0.6 wt.-% of at least one rehology modifier
- 0.05-0.5 wt.-% of at least one surfactant, based on the total weight of the first coating layer (2), 5 to 20 wt % of a second coating layer (1) consisting on the following components

- 60-82 wt % of the at least a special anionic ground calcium carbonate with a particle size d50 of ≤300 nm not stable in high conductivity systems
- 2.0-7.0 wt % of the at least one non-ionic polyvinyl alcohol,
- 0.5-5% wt % of carboxymethylcellulose
- 4-10 wt % of special styrene butadiene latex as a hydrophobic binder stable in high conductivity systems
- 1.0-10.0 wt % of polydiallyldimethylammonium chloride
- 5-20 wt % of CaCl2) as a wetting agent and viscosity modifier based on the total weight of the second coating layer (1), Container board or cardboard may comprise carton board or boxboard or corrugated board. Container board may encompass linerboard and or corrugating medium. Both, linerboard and a corrugating medium are used to produce corrugated board.

In a preferred embodiment, the base paper (3) has been produced using recycled fiber, mainly brown grades mainly qualities 1.01, 1.02, 1.04, 1.05, 4.01, 4.02 following EN-643. The difficulty of using this kind of material is, because of its origin, that in the surface of the base paper produced with it, appears a lot of hidrofobic particles, named generally stickies, that interfere in the binding process between the first coating layer and the base paper.

Substrate paper is characterized by its color. Raw materials to produce substrate paper are fibers obtained of recycling paper, board, container board and paper board and other. Because of that origin, substrate paper might show a brownish color. Values of ISO B brightness are between 16 to 29° ISO.

As the final print medium brightness should be in the range to 70 to 87° ISO, but preferably between 80 to 85° ISO, that means that the ISO brightness increase must be between 50 to 70° ISO. This increase is challenging and makes that the selected pigments to be applied may provide us very high opacity and brightness. Right base-paper brightness (at least above 18° ISO) allows for using efficiently the coating layer. The brighter the base paper is, the lower the amount of coating add-on required in order to reach the final print medium brightness.

Air resistance of the base paper and of the final print medium are key in order to allow the ink to penetrate through the coating layer, pass through the coating layer and the base paper interface and finally penetrate into the base paper. This whole process will improve the ability of the print medium to absorb the ink add-on, improve drying and increase the printing process speed.

In a preferred base-paper embodiment, the base paper has a Gurley permeability below 100 seconds.

In a preferred base-paper embodiment, the base paper surface has a Cobb 60 seconds value between 20 to 40 g/m$^2$ but preferably between 30 to 40 g/m$^2$. With a Cobb 60 seconds result between 20 to 30, the Cobb 30 min value is between 80 to 150 g/m$^2$.

Base paper water resistance is as key as base paper brightness to reach efficiently final print-medium brightness. When water resistance is in a certain range, the coating layer remains on top of the base paper without exceedingly penetrating the base paper. Therefore, it increases efficiency in reaching the final print-medium brightness. When the water resistance is out of the defined range (cobb 30 minutes of 20 to 40 g/m$^2$) the process is not fully efficient. Below that range the ink penetration might be limited.

Synthetic sizing agents, like styrene acrylates, ASA (Alkenyl Succinic anhydride), AKD (Alkyl Ketene Dimer) or others, either cationic, anionic or amphoteric, provide a certain degree of hydrophobicity to the substrate in order to control the penetration of the first pigmented layer in contact with the substrate and to avoid the migration of binder to the substrate before drying.

In a preferred embodiment on the base paper has been treated with synthetic sizing agent, styrene acrylate based product, during its production. In a more preferred embodiment synthetic sizing agent has been applied in one or both sides of the paper using a conventional Size Press or a Metering Size Press. In a most preferred embodiment, synthetic sizing agent has been applied in the amount needed to get the correct hydrophobicity measured as Cobb 60 seconds between 20 to 50 gsm (grams by sq-meter).

The roughness of the substrate paper is very important to the final print medium. The desired roughness is achieved in a process called calendering. In this process, by applying pressure and temperature, combined with shearing forces, it is possible to reduce the roughness of the substrate paper. This process can be developed with several different pressure, temperature and humidity levels. Low substrate paper roughness improves printing quality but negatively affects paper-substrate absorption. It is necessary to achieve an equilibrium between both objectives.

Roughness level is key in order to reach a homogeneous coating application on base paper, which is critical to perform optimal printability. A right balance between brightness development and coating adds-on and reduces operational and raw material costs.

In a preferred embodiment, the base paper (3) has been pressed in a hard nip calender using different pressures between 30 to 110 kN/m linear load depending of the grammage of the base paper to reduce the surface roughness and with a temperature between 95-105° C.

In a preferred embodiment the base paper surface has a roughness value below 7 pps (Parker Print Surf), preferably below 5 pps.

In a preferred embodiment the base paper surface has a roughness value below 900 Bendtsen, preferably between 200 and 400 Bendtsen.

According to one embodiment, the print medium could be post-calendered, or not, depending of final roughness target and gloss value, typically below 5 pps (Parker Print Surf).

In a preferred base-paper embodiment, the base paper surface has a Bendtsen permeability above 15 mls/min.

The base paper, cardboard or containerboard substrate can have a basis weight from 60 to 300 g/m$^2$.

Another object of this invention is the packaging product comprising a print medium of any of the embodiments above described.

Another object of this invention the method for producing the print medium of any of the embodiments above described.

Figure 5:
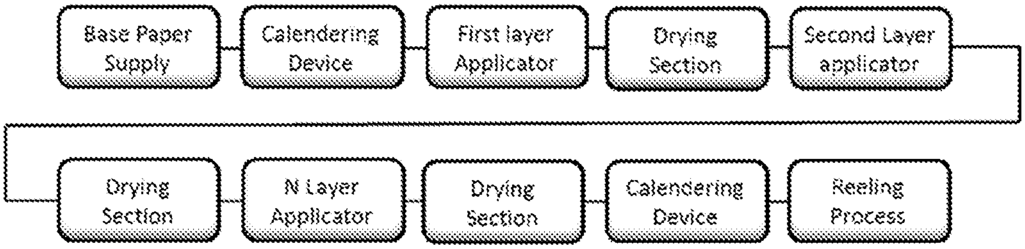
FIG. 5 shows a block diagram of the main stations or steps of the method for producing a print medium.

A method for producing the print medium is schematically shown in FIG. 5. It comprises the following steps:

- supplying a base paper (3)
- applying an external or top white side (4) on at least one side of the base paper (3)
- drying the external or top white side (4).
- reeling the base paper (3) with the external or top white side (4).

without the need of the application of a primmer or a bonding agent prior to or on color printing in a digital printer, or without or without the need of a dryer on or after color printing in a flexographic printer.

In a preferred embodiment, the external or top white side (4) comprises two layers. In this case the method for producing a print medium, comprises the following steps:

- Applying a first coating layer (2) to the base paper (3) by a curtain coater
- Drying the first coating layer (2).
- Applying a second coating layer (1) by a blade coater
- Drying the second coating layer (1).

As mentioned before to have two or more layers is important because it permits functionalize the performance of each one of them.

In a more preferred embodiment, the first coating layer (2) comprises two sub-layers. In this case, the method of application and drying of first coating layer (2) comprises the following steps:

- Applying a first sublayer of the first layer (2.2) by a curtain coater.
- Applying a second sublayer of the first layer (2.1) by a curtain coater.
- Drying the first sublayer of the second layer (2.2) and the second sublayer of the second layer (2.1).

The use of a curtain coater for the first sublayer of the first layer is important because it permit optimize the cost of the layer because of the high cost of the opacifying mineral particle.

The use of a curtain coater for the second sublayer of the first layer is important because it permits to develop asymmetric layers together with the first sublayer in order to optimize the cost and the functionalization of the first layer.

In a more preferred embodiment, the second coating layer (1) comprises two sub-layers. In this case, the method of application and drying of second coating layer (1) comprises the following steps Applying a first sublayer of the second layer (1.2) by a blade coater Drying the first sublayer of the second layer (1.2)

Applying a second sublayer of the second layer (1.1) by a blade coater.

Drying the second sublayer of the second layer (1.1)

The use of a blade coater for the first sublayer of the second layer is important because we can functionalize the layer to develop a better roughness before the second sublayer The use of a blade coater for the second sublayer of the second layer is important because to have a perfect printability and absorption.

In a preferred embodiment, the base paper (3) supplied is pressed to reach a desired surface roughness by an on line or off line calender prior to the application of the external or top white side (4).

In a preferred embodiment, the print medium paper is pressed for improving final product roughness by an on line or off line calender after the drying the final external or top white side (4).

Print medium manufacturing may take place on an industrial unit called "on line machine coater" or continuous web which produces both substrate and one or more permeable coating applications.

Another option of the print medium manufacturing is through a sequence of discrete units called jumbo/parent rolls or cut to smaller reels where substrate and coating application are done separately "off line machine coater".

In a preferred embodiment, the application and drying of the first external or top white side (4) to one or both sides of the base paper (3) is divided in the application and drying of a first and a second coating layer.

The first coating layer (2) is applied to the base paper (3) by curtain comprising one or multiple plies, every of them supplied by such kind of coating technology, and then dried. Then the second coating layer (1) is applied by blade, knife coater, metering size press, metering rod; moisturizer, spray beam or combinations of up to three of those coating technologies in a serial mode. Then the second coating layer (1) is dried.

In a most preferred embodiment, the method for producing a print medium paper comprises applying the second coating layer (1) in two different subsequent sublayers which are dried between applications.

In a preferred embodiment, the base paper (3) supplied is pressed to reach the desired surface roughness by an on line or off line calender, prior to the application of the external or top white side (4) or after the final drying of the external or top white side (4).

The print medium may be subjected, after coating, to post-calendering to enhance surface smoothness. For example, calendaring may be carried out at a temperature from 20 to 200° C., preferably from 60 to 150° C., using a calender of 1 to 10 nips. Said nips may be hard or soft, with a lineal load range of 10-200 KN/m preferably from 20 to 150 KN/m.

Different suitable coating methods can be applied simultaneously to manufacture the print medium applying coating pigments. For example, two layers using coating pigments, equal or different, using curtain coater in serial mode. For example, three layers using coating pigments, equal or different, using curtain coater (two layers) plus blade coater (one layer) in serial mode. For example, four layers using coating pigments, equal or different, using curtain coater (two layers) plus blade coater (one layer) plus metering size press coater (one layer) in serial mode. For example, five layers using coating pigments, equal or different, using curtain coater (two layers) plus blade coater (one layer) plus metering size press coater (one layer) plus spray coater (one layer). Preferably, four layers using coating pigments, equal or different, using curtain coater (two layers) plus blade coater (one layer) plus metering size press coater (one layer) in serial mode. More preferably, four layers using coating pigments, equal or different, using curtain coater (two layers) plus blade coater (one layer) plus spray coater (one layer) in serial mode.

In the most preferred embodiment (FIG. 5), the process consists in the following steps.

1. Base paper (3) is optionally precalendered through a calendering process where the paper is pressed to the targeted roughness by a combination of pressure and temperature (Step 1).
2. Once the paper surface has reached the desired roughness, a first coating layer (2) of the external or top white side (4) is applied (Step 2). This coating application is usually done by a curtain coater unit where one or several plies are added to the paper surface.
3. Immediately to the first coating application, a drying section is required in order to link the coating to the paper surface and remove the remaining moisture (Step 3).
4. A first sublayer of the second coating layer (1) of the external or top white side (4) is applied afterwards (Step 4) by a blade coating unit.
5. Immediately after the application of first sublayer of the second coating layer, a drying section is required in order to link the coating to and remove the remaining moisture (Step 5).
6. Finally, a second sublayer of the second coating layer (1) of the external or top white side (4) is applied on top of dried first sublayer of the second coating layer (1) of the external or top white side (4) (Step 6).
7. Immediately, the new sublayer is dried in order to link the coating to the previous layer and to remove remaining moisture (Step 7).
8. As last step, the base paper (3) with the external or top white side (4) might be compressed through a calendering process in order to increases glossy effect and to improve final roughness. This calendaring process is being reached through a pressure-temperature combination (Step 8). This step might be combined with step 1.

Another object of this invention is the device for implementing the method for producing the print medium of any of the embodiments above described. This device comprises means for supplying a base paper (3)

means for applying an external or top white side (4) to the base paper (3)

means for drying the external or top white side (4)

means for reeling the print medium (3).

In a preferred embodiment the external or top white side (4) comprises two layers. In this case the means for drying the external or top white side (4) comprise A curtain coater for applying a first coating layer (2) to the base paper (3)

Means for drying the first coating layer (2).

A blade coater for applying a second coating layer (1)

Means for drying the second coating layer (1).

In a more preferred the second coating layer (1) comprises two sub-layers. In this case the means for applying a second coating layer (1) and the means for drying the second coating layer (1) comprise A blade coater for applying a first sublayer (1.2) of the second coating layer (1)

Means for drying the first sublayer (1.2) of the second coating layer (1).

A blade coater for applying a second sublayer (1.1) of the second coating layer (1).

Means for drying the second sublayer (1.1) of the second coating layer

In a preferred embodiment, the device comprises means for calendaring the base paper (3) prior to the application of the external or top white side (4).

In a preferred embodiment, the device comprises means for calendaring the base paper (3) after the drying the final external or top white side (4).

Another object of this invention is the use of a digital printer or a printer based on the use of inkjet technology heads for printing a print medium according to any of the embodiments described above, wherein the print medium is printed directly without the need of the application of a primmer or a bonding agent prior to or on color printing.

Another object of this invention is the use of a flexographic printer for printing a print medium according to any of the embodiments described above wherein the print medium is printed without the need of a dryer on or after color printing devices.

In a preferred embodiment, the digital printer or printer based on the use of inkjet technology heads, is configured on roll to roll (pre-print).

In another preferred embodiment, the digital printer or printer based on the use of inkjet technology heads, is configured on sheet to sheet or flatbed printers.

The invention claimed is:

1. A print-medium paper suitable to be printed directly in a digital printer, without the need of the application of a primmer or a bonding agent prior to or on color printing or suitable to be printed in a flexographic printer without the need of a dryer on or after color printing devices comprising a base paper (3) and at least one external layer or top white side (4):

characterized in that the base paper (3) is containerboard grade made out of 60% to 100% recycled fibers suitable to be used in corrugated board products treated with styrene acrylate based product as a synthetic sizing agent, and in that the external layer or top white side (4) comprises a first coating layer (2) that comprises anionic ground calcium carbonate as a mineral particle with a monomodal pore size distribution, a volume defined pore size polydispersity expressed as full width at half maximum (FWHM) from 40 to 80 nm, and a volume defined median pore diameter from 30 to 80 nm, titanium dioxide as a mineral particle styrene butadiene latex as a hydrophobic binder non-ionic polyvinyl alcohol as a hydrophilic binder at least one rheology modifier at least one surfactant, a second coating layer (1) applied once the first coating layer (2) is dried that comprises anionic ground calcium carbonate comprising a dispersing agent non-ionic polyvinyl alcohol as a first hydrophilic binder carboxymethylcullose as second hydrophilic binder styrene butadiene latex, comprising a dispersing agent, as a hydrophobic binder polydiallyldimethylammonium chloride (PolyDadmac) as a cationic polymer Calcium chloride as a wetting agent and viscosity modifier.

2. A print-medium paper according to claim 1, characterized in that it comprises, 70 to 90 wt % of a base paper, made of 60 to 100% recycled based material 5 to 20 wt % of a first coating layer (2) consisting on the following components:

60-82 wt % of anionic ground calcium carbonate with a particle size $d_{50}$ of ≤300 nm 0-25 wt % of titanium dioxide 5-14 wt % of styrene butadiene latex as a hydrophobic binder 0.2-2 wt-% of at least one non-ionic polyvinyl alcohol, 0.05-0.6 wt-% of at least one rehology modifier 0.05-0.5 wt-% of at least one surfactant, based on the total weight of the first coating layer (2), 5 to 20 wt % of a second coating layer (1) consisting on the following components 60-82 wt % of the at least a anionic ground calcium carbonate with a particle size d50 of ≤1500 nm comprising a dispersing agent 2.0-7.0 wt % of the at least one non-ionic polyvinyl alcohol, 0.5-5% wt % of carboxymethylcullose 4-10 wt % of styrene butadiene latex as a hydrophobic binder comprising a dispersing agent 1.0-10.0 wt % of polydiallyldimethylammonium chloride 5-20 wt % of CaCl2 as a wetting agent and viscosity modifier based on the total weight of the second coating layer (1).

3. A print-medium paper according to claim 1, characterized that the base paper (3) has been produced using recycled fiber, mainly brown grades mainly qualities 1.01, 1.02, 1.04, 1.05, 4.01 or 4.02 following EN-643 standard classification.

4. A print-medium paper according to claim 1, characterized in that synthetic sizing agent has been applied in one or both sides of the paper using a conventional Size Press or a Metering Size Press.

5. A print-medium paper according to claim 1, characterized in that synthetic sizing agent has been applied in the amount needed to get the correct hydrophobicity measured as 1.02 seconds between 20 and 50 g/m$^2$.

6. A print-medium paper according to claim 1, characterized in that the base paper (3) has been pressed in a hard nip calendar using different pressures between 30 and 110 KN/m linear load depending of the grammage of the base paper to reduce the surface roughness and with a temperature between 95 and 105° C.

7. A print-medium paper according to claim 1, characterized in that the base paper (3) surface has a roughness value below 7 pps.

8. Use of an external layer or top white side (4) that comprises a first coating layer (2) that comprises
- anionic ground calcium carbonate with a particle size $d_{50}$ of ≤300 nm, as a mineral particle with
  - a monomodal pore size distribution,
  - a volume defined pore size polydispersity expressed as full width at half maximum (FWHM) from 40 to 80 nm, and
  - a volume defined median pore diameter from 30 to 80 nm,
- titanium dioxide as a mineral particle
- styrene butadiene latex as a hydrophobic binder
- non-ionic polyvinyl alcohol as a hydrophilic binder
- at least one rheology modifier
- at least one surfactant, a second coating layer (1) applied once the first coating layer (2) that comprises
- anionic ground calcium carbonate comprising a dispersing agent
- non-ionic polyvinyl alcohol as a first hydrophilic binder
- carboxymethylcullose as second hydrophilic binder
- styrene butadiene latex, comprising a dispersing agent, as a hydrophobic binder
- polydiallyldimethylammonium chloride (PolyDadmac) as a cationic polymer
- Calcium chloride as a wetting agent and viscosity modifier with a containerboard-grade base paper (3) made out of 60% to 100% recycled fibers treated with styrene acrylate product as a synthetic sizing agent suitable to be used in corrugated board products.

9. Packaging product comprising a print-medium paper according to claim 1.

10. A method for producing a print medium according to claim 1, characterized in that it comprises the following steps:

supplying a containerboard-grade base paper (3) made out of 60% to 100% recycled fibers suitable to be used in corrugated board products treated with styrene acrylate product as a synthetic sizing agent applying, on at least one side of the base paper (3), a first coating layer (2) by a curtain coater that comprises
- anionic ground calcium carbonate with a particle size $d_{50}$ of ≤300 nm, as a mineral particle with
  - a monomodal pore size distribution,
  - a volume defined pore size polydispersity expressed as full width at half maximum (FWHM) from 40 to 80 nm, and
  - a volume defined median pore diameter from 30 to 80 nm,
- titanium dioxide as a mineral particle
- styrene butadiene latex as a hydrophobic binder
- non-ionic polyvinyl alcohol as a hydrophilic binder
- at least one rheology modifier
- at least one surfactant, Drying the first coating layer (2), Applying a second coating layer (1) by a blade coater that comprises
- anionic ground calcium carbonate with a particle size $d_{50}$ of ≤1500 nm comprising a dispersing agent
- non-ionic polyvinyl alcohol as a first hydrophilic binder
- carboxymethylcullose as second hydrophilic binder
- styrene butadiene latex, comprising a dispersing agent, as a hydrophobic binder
- polydiallyldimethylammonium chloride (PolyDadmac) as a cationic polymer
- Calcium chloride as a wetting agent and viscosity modifier drying the second coating layer (1), reeling the base paper (3) with the external or top white side (4).

11. A method for producing a print medium, according to claim 10, characterized in that the application and drying of first coating layer (2) comprises the following steps:

Applying a first sublayer of the first layer (2.2) by a curtain coater,

Applying a second sublayer of the second layer (2.1) by a curtain coater,

Drying the first sublayer of the second layer (2.2) and the second sublayer of the second layer (2.1).

12. A method for producing a print medium, according to claim 11, characterized in that the application and drying of the second coating layer (1) comprises the following steps:

Applying a first sublayer of the second layer (1.2) by a blade coater

Drying the first sublayer of the second layer (1.2)

Applying a second sublayer of the second layer (1.1) by a blade coater,

Drying the second sublayer of the second layer (1.1).

13. A method for producing a print medium, according to claim 10, characterized in that the base paper (3) supplied is pressed to reach a desired surface roughness by an on line or off line calender prior to the application of the external or top white side (4).

14. A method for producing a print medium, according to claim 10, characterized in that the print medium paper is pressed for improving final product roughness by an on line or off line calender after the drying the final external or top white side (4).

15. Use of a print medium according to claim 1 in a digital printer or a printer based on the use of inkjet technology heads, characterized in that the print medium is printed directly without the need of the application of a primer or a bonding agent prior to or on color printing.

16. Use of a print medium according to claim 1 in a flexographic printer, characterized in that the print medium is printed without the need of a dryer on or after color printing devices comprising.

17. Use according to claim 15, characterized in that the printer is configured on roll to roll.

18. Use according to claim 15, characterized in that the printer is configured on sheet to sheet or flatbed printers.

* * * * *